US012519667B1

(12) United States Patent
Choo et al.

(10) Patent No.: US 12,519,667 B1
(45) Date of Patent: Jan. 6, 2026

(54) ELECTRONICALLY VERIFIED COMMAND TRANSMISSION BETWEEN PROGRAMS

(71) Applicant: Citibank, N.A., New York, NY (US)

(72) Inventors: Haiping Choo, Marina Bay (SG); Aharon Haber, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/077,928

(22) Filed: Mar. 12, 2025

(51) Int. Cl.
  *H04L 9/00* (2022.01)
  *G06F 9/54* (2006.01)
(52) U.S. Cl.
  CPC ............... *H04L 9/50* (2022.05); *G06F 9/546* (2013.01)
(58) Field of Classification Search
  CPC ................................... H04L 9/50; G06F 9/546
  See application file for complete search history.

(56) References Cited

U.S. PATENT DOCUMENTS

| | | | | |
|---|---|---|---|---|
| 2018/0113752 A1* | 4/2018 | Derbakova | ........... | H04L 9/3239 |
| 2019/0018888 A1* | 1/2019 | Madisetti | ................ | G06F 16/27 |
| 2020/0334204 A1* | 10/2020 | Irazabal | .............. | G06F 16/1837 |
| 2024/0154800 A1* | 5/2024 | Fernando | ................ | H04L 9/088 |
| 2024/0281799 A1* | 8/2024 | Ryan | ................... | G06Q 20/3678 |
| 2024/0378264 A1* | 11/2024 | Schwarz | ............. | H04L 63/0823 |
| 2024/0412207 A1* | 12/2024 | Williams | ............. | G06Q 20/405 |
| 2024/0428306 A1* | 12/2024 | Sliwka | ................... | H04L 9/0891 |
| 2025/0070976 A1* | 2/2025 | Kavian | ...................... | H04L 9/50 |
| 2025/0150291 A1* | 5/2025 | Zheng | ..................... | G06Q 20/40 |
| 2025/0245649 A1* | 7/2025 | Gorham | ................ | G06Q 20/06 |

* cited by examiner

*Primary Examiner* — Taghi T Arani
*Assistant Examiner* — Blake I Narramore
(74) *Attorney, Agent, or Firm* — Perkins Coie LLP

(57) ABSTRACT

Systems and methods for using on-chain programs for message transfer are disclosed herein. A system may receive a request to obtain control of second on-chain data structures of a second type. The request may comprise identifiers for first on-chain data structures of a first type. The system may determine that the first type is stored on a first blockchain and the second type is stored on a second blockchain and execute an operation that transfers control of first on-chain data structures of the first type to be controlled by a second cryptography-based storage application associated with an agent on the first blockchain. In response to a confirmation that the operation was successful, the system may cause a message to be transmitted to a second on-chain program instructing it to transfer the second on-chain data structures to be controlled by the user.

20 Claims, 7 Drawing Sheets

```
request{
    request_id: "d2nj2k3jn"
    first_blockchain_id: "AAA"
    second_blockchain_id: "BBB"
    first_asset_ids: ["3jebdj23h", "1kjenk2j3", "23kjrj23k"]
    user_wallet_address: 0x123krnkjensd...
    first_asset_type: "ATYPE"
    second_asset_type: "BTYPE"
    exchange_rate: 23-1
}
```

*FIG. 2*

```
cross_chain_msg_1{
        sourcechain_id: "AAA"
        destinationchain_id: "BBB"
        sender: "0x2oi3jeisowiedjowied"
        receiver: "0x2kmk2emdwlswe3"
        payload: "0xqoijeo23ijdwsdjdewwedsdg23jhew"
        function_call: "exchange:24"
        nonce: 23
        proof: "21kehkj3ekdmxalkdq"

```
cross_chain_msg_2{
        sourcechain_id: "BBB"
        destinationchain_id: "AAA"
        sender: "0x2kmk2emdwlswe3"
        receiver: "0x123kmkjensdweurh2i"
        payload: "success – ownership transferred; txid:ej3n5kdwjnd;"
        nonce: 26
        proof: "OIDSJAOISJoisjo23iedq"

ELECTRONICALLY VERIFIED COMMAND TRANSMISSION BETWEEN PROGRAMS

SUMMARY

In recent years, the use of blockchains and blockchain technology has exponentially increased. Blockchains are built upon lists of records, called "blocks," that are "chained" together using cryptography. Each block may include data that is computed using a one-way function (e.g., a function that is practically impossible to invert or reverse-compute) of a previous block, a timestamp (e.g., indicating a creation and/or modification time), and additional data (e.g., transactional or operational data related to blockchain operations). While publicity for blockchains and blockchain technology has been concentrated on its use for cryptocurrencies and smart contracts, blockchains and blockchain technology may be applicable to numerous technological avenues. Private blockchains have been created by various entities for various purposes. Blockchain nodes within these private blockchains are able to communicate easily to create and verify new blocks, replicate data, etc. However, inter-blockchain communication is not easily performed.

Accordingly, a mechanism is disclosed herein for performing operations using two different blockchains through cross-chain messaging. In particular, a messaging system may be used to perform operations disclosed herein. The messaging system may be stored as a smart contract on the blockchain.

The messaging system may receive a request to exchange one type of token for another type of token. The messaging system may then determine that the first type of token is located on a first blockchain and a second type of token is located on a second blockchain. Based on this determination, the messaging system may transfer tokens of the first type to an agent on the first blockchain and may also transmit a cross-chain message to an on-chain program on the second blockchain instructing the second blockchain to transfer on-chain tokens to the user's wallet.

For example, a user may desire to acquire a particular product. However, the user may only have tokens of a particular type on a particular blockchain, and the product may be associated with on-chain tokens on a different blockchain (e.g., a blockchain operated by another entity). The system may send a message to the second blockchain to perform a token transfer to the user's wallet. The message may include a number of tokens that the user has transferred to an agent. The second on-chain program on the second blockchain may determine an exchange rate for the user's tokens and the target tokens and may assign the target tokens to the user on the second blockchain.

In some embodiments, the user's tokens may not be supported by the agent. Thus, the messaging system may first exchange the user's tokens into another token type that is supported by the agent. For example, an agent may support USD tokens while the user may have SGD tokens. Accordingly, the messaging system may first exchange the SGD tokens into the USD tokens before proceeding with sending a message to the second blockchain.

In some embodiments, the messaging system may enable a user to exchange the tokens back (e.g., for a profit). Thus, the messaging system may receive a request to exchange the target tokens back to the original type of tokens the user had. Thus, the messaging system may instruct the user's wallet to relinquish control of the target tokens. Once that has been completed, the messaging system may send a message from the second blockchain to the first blockchain indicating that the transfer completed successfully. The messaging system may then determine the exchange rate (e.g., the profit) between the tokens and transfer the original types of tokens back to the user's wallet (e.g., including the profit).

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data) unless the context clearly dictates otherwise.

BRIEF DESCRIPTION OF THE DRAWINGS

FIG. 2 illustrates an exemplary blockchain operation request, e.g., for using on-chain programs for message transfer, in accordance with one or more embodiments of this disclosure.

FIG. 4A illustrates an exemplary cross-chain message for instructing transfer of on-chain data structures, in accordance with one or more embodiments of this disclosure.

FIG. 4B illustrates an exemplary cross-chain message indicating that on-chain data structures are controlled by a user, e.g., after transfer, in accordance with one or more embodiments of this disclosure.

DETAILED DESCRIPTION

Figure 1:
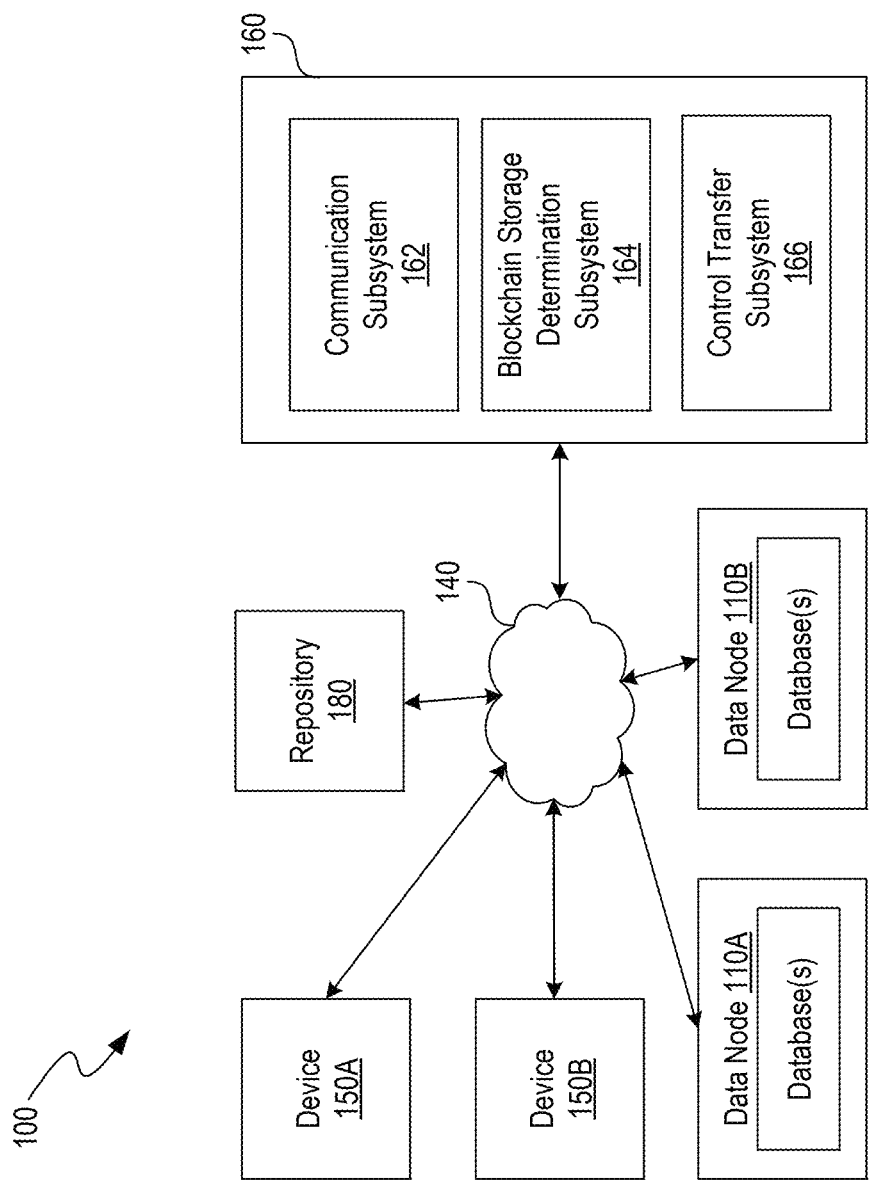
FIG. 1 shows an illustrative system for using on-chain programs for message transfer, in accordance with one or more embodiments of this disclosure.

In the following description, for the purposes of explanation, numerous specific details are set forth in order to provide a thorough understanding of the disclosed embodiments. It will be appreciated, however, by those having skill in the art that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Attempting to create a process for cross-chain messaging in view of the available conventional approaches created significant technological uncertainty. Creating such a process required addressing several unknowns in conventional approaches of cross-chain transfers of tokens such as potential security risks and challenges stemming from regulatory constraints, permissioning issues, and lack of infrastructure. For example, many private blockchains, e.g., specific to companies, lack the infrastructure to enable issuance and transfer of non-native tokens. In particular, many private blockchains are custom-built for enterprise use and token support is not their main focus. However, many public blockchains have well-stablished bridges, wrapping services, and protocols that make non-native asset handling easier. Private blockchains often purposely lack these infrastructures because they are isolated from public networks for safety and compliance reasons. In particular, regulated institutions must control asset movement, so they cannot allow for any token to enter their ecosystem freely.

As described herein, conventional approaches do not allow for private blockchains to efficiently and effectively perform cross-chain communication freely while also maintaining security and adhering to legal standards for asset handling. Conventional approaches thus limit users of private blockchains while effectively providing users with a choice between public blockchains that may not be regulated as stringently, and thus are not as safe, or private blockchains that are significantly limited because it is difficult (e.g., computationally expensive) to oversee and ensure compliance of cross-chain messaging to keep in alignment with entity-specific or regulation-specific rules. Conversely, the disclosed system enables a computationally conservative method for cross-chain communication for private blockchains that ensures security and compliance.

For example, rather than having countless transactions across blockchains that are computationally expensive to oversee and monitor, the disclosed system utilizes a transfer agent having a designated cryptography-based storage application. Cross-chain communications and transfers may be sent through the transfer agent as intermediary, thus creating a single point for review at which operators can ensure security and safety. The transfer agent may act in accordance with one or more smart contracts implemented by the entity, which can ensure that cross-chain transfers only occur when specific conditions are met. Doing so provides for easier recordkeeping (e.g., the system can pull records specific to the cryptography-based storage application linked to the transfer agent).

To overcome the technological uncertainties, the inventors systematically evaluated multiple design alternatives. For example, the inventors attempted various ways of reviewing cross-chain communications to ensure compliance with dynamic security regulations. For example, the use of operators for reviewing transactions or automatic programs that parsed through every transaction prior to accepting the transactions onto the blockchain proved to be problematic as it was both time- and resource-intensive. For example, reviewing each transaction to prevent unauthorized (e.g., not in compliance) cross-chain communication expended computational resources and also added latency to every transaction on the blockchain. Similarly, attempting to find and reverse such invalid cross-chain communications after committing the communication to the blockchain did not solve the security issues.

Thus, the inventors experimented with different methods for enabling cross-chain communications for private blockchains that are in compliance with dynamic security regulations. For example, the inventors attempted different communication and exchange protocols between different blockchains to identify the most efficient and effective approaches.

As described herein, techniques are disclosed herein for enabling inter-blockchain communication. In particular, environment 100 of FIG. 1 shows an illustrative system that can use on-chain programs for message transfer operations. Environment 100 includes device 150A, device 150B, cross-chain messaging system 160, data node 110A, data node 110B, and repository 180.

Cross-chain messaging system 160 of environment 100 may execute instructions for performing operations for using two different blockchains through cross-chain messaging. Cross-chain messaging system 160 may include several subsystems, each configured to perform one or more steps of the methods described herein, such as communication subsystem 162, blockchain storage determination subsystem 164, and control transfer subsystem 166. Cross-chain messaging system 160 may include software, hardware, or a combination of the two. For example, cross-chain messaging system 160 may be hosted on a physical server or a virtual server that is running on a physical computer system. In some embodiments, cross-chain messaging system 160 may be configured on a user device (e.g., a laptop computer, a smartphone, a desktop computer, an electronic tablet, or another suitable user device).

As described herein, cross-chain messaging system 160 may be used to facilitate communication (e.g., messaging) between different blockchains. In particular, cross-chain messaging system 160 may be in communication (e.g., via network 140) with a plurality of different blockchains, such as through different data nodes. In the example of environment 100, cross-chain messaging system 160 is illustrated to be in communication with data node 110A, through which the system may access a first blockchain, and with data node 110B, through which the system may access a second blockchain.

Data node 110A and data node 110B may each be a blockchain node of a first blockchain and second blockchain, respectively. Data node 110A and data node 110B may store various data, including user data, copies of on-chain programs, and/or other suitable data. Data node 110A and data node 110B may each include software, hardware, or a combination of the two. For example, data node 110A and data node 110B may each be a physical server or be a virtual server that is running on a physical computer system. In some embodiments, the messaging system and data node 110A or data node 110B may reside on the same hardware and/or the same virtual server/computing device. Network 140 may be a local area network, a wide area network (e.g., the Internet), or a combination of the two.

According to some examples, the first blockchain may include a private blockchain, such as a permissioned blockchain network where access is restricted to a specific group of participants. Unlike public blockchains (e.g., Bitcoin, Ethereum), which are open to anyone, private blockchains may be run or controlled by an organization or governing entity that dictates who may participate, validate transactions, and maintain the ledger. In some examples, the private blockchain may also be subject to specific security protocols or guidelines set by the entity or a different governing authority.

A device such as device 150A may be associated with a cryptography-based storage application used at a data node, such as data node 110A. A cryptography-based storage application may also include software, hardware, or a combination of the two. For example, each cryptography-based storage application may include software executed on one device or multiple devices or may include hardware such as a physical device. In some cases, the cryptography-based storage application may be software and may be stored in user devices (e.g., client devices such as smartphone, laptops, electronic tablets, etc.), and a user of the cryptography-based storage application may access the cryptography-based storage application on those devices. Alternatively or additionally, the cryptography-based storage application may reside on a special device (e.g., a fob) intended for storing the cryptography-based storage application. For example, the device may store private keys in a memory of the device and allow transactions to be signed (e.g., via generating a cryptographic signature) on the device itself. Examples of cryptography-based storage applications may include cryptographic wallets. For example, a cryptography-based storage application may be referred to as a "digital wallet" (e.g., hot wallet, cold wallet, etc.). As described herein, some examples of hardware cryptographic wallets include Ledger®, and Trezor®. Software cryptographic wallets may include Metamask® and others. Similarly, device 150B may be associated with a cryptography-based storage application used at a data node, such as data node 110B.

As described herein, cross-chain messaging system 160 may be used, such as by users of different blockchains, to enable cross-chain messaging including operations such as transferring control of different on-chain data structures. As referred to herein, on-chain data structures may include data structures representing instruments such as cryptocurrencies, stablecoins, tokenized assets, smart contracts-based derivatives, non-fungible tokens (NFTs), decentralized finance (DeFi) instruments, central bank digital currencies (CBDCs), decentralized autonomous organizations (DAOs), and governance tokens.

According to some embodiments, cross-chain messaging system 160 may be stored as an on-chain program such as a smart contract on the blockchain. Although illustrated as being separate components in environment 100, the cross-chain messaging system 160 may be deployed on the first blockchain (e.g., accessible via data node 110A) to execute and perform various functions. As described herein, an on-chain program or on-chain program code may refer to a computer program or any suitable code for performing computing operations stored on a blockchain. For example, an on-chain program may reference a program stored on a blockchain or other distributed ledger. In particular, an on-chain program may be used to automate the execution of a transaction, such as a blockchain operation. In some examples, an on-chain program may refer to a smart contract executed on a blockchain. In one example, an on-chain program may run when predetermined conditions are satisfied.

As described herein, the messaging system may be used to exchange a first type of instrument (e.g., token) located on a first blockchain with a second type of instrument (e.g., token) located on a second blockchain. For example, a second type of instrument may be, in some embodiments, a non-native or unchained asset that can be used across different blockchains. In some embodiments, the unchained asset may originate from a specific blockchain.

In particular, a first user on a device such as device 150A may be a user of a first blockchain accessible through data node 110A. The first user may access and perform operations on the first blockchain through a cryptography-based storage application associated with device 150A. In some embodiments, the user may be limited to instruments (e.g., tokens) of the first blockchain or otherwise restricted from instruments of a second blockchain, such as a second blockchain accessible through data node 110B. For example, the cryptography-based storage application may only be equipped to handle the instruments of the first blockchain or may be restricted from using the instruments of the second blockchain. For example, only a transfer agent on the first blockchain may be allowed to make certain transfers (e.g., exchanges between instruments of a first type and a second type) that a regular user on the blockchains may not be able to make due to regulatory, operational, and/or security reasons. Alternatively or additionally, the cryptography-based storage application of the first user may simply not be registered or initialized for instruments of the second blockchain.

The first user may desire to perform a variety of cross-chain operations, such as exchanging tokens of the first blockchain with those of the second (e.g., to purchase or otherwise obtain non-native or unchained assets). For example, a first user may operate on Solana, having a native token of SOL, and wish to purchase a non-native token such as SHIB. In order to do so, the first user may first make a request, such as through a cryptography-based storage application accessible through device 150A.

Communication subsystem 162 of cross-chain messaging system 160 may be used to receive the request. Communication subsystem 162 may include software components, hardware components, or a combination of both. For example, communication subsystem 162 may include a network card (e.g., a wireless network card and/or a wired network card) that is associated with software to drive the card. Communication subsystem 162 may pass at least a portion of the data, or a pointer to the data in memory, to other subsystems such as blockchain storage determination subsystem 164 and control transfer subsystem 166.

As described herein, cross-chain messaging system 160 may be an on-chain program such as a smart contract and can be used to receive the request from a user via a first cryptography-based storage application, e.g., using device 150A or 150B. The request may include a blockchain operation request to obtain control of a plurality of on-chain data structures of a specific type, such as a second type different from a first type used on the first blockchain. The request may also indicate on-chain data structures of the first type with which the user desires to exchange in order to obtain the on-chain data structures of the second type.

For example, FIG. 2 is an example of a blockchain operation request 200, in accordance with one or more embodiments of this disclosure. The blockchain operation request 200 may include identifiers for on-chain data structures of the first type, e.g., with which to exchange for on-chain data structures of the second type. In some examples, the on-chain data structures of the first type may be non-fungible and thus the request may include identifiers that uniquely identify each on-chain data structure of the first type, such as using unique alphanumeric strings. For example, blockchain operation request 200 includes identifiers "first_asset_ids: ["3jebdj23h"; "1kjenk2j3", "23kjrj23k"]."

Alternatively or additionally, the on-chain data structures may be fungible, in which case, rather than identifying each of the plurality of on-chain data structures of the first type, the request may simply indicate the user's wallet address, and the system may use the address to identify instruments of the first type stored in the wallet address. In this case, the request may additionally optionally identify a number of on-chain data structures of the first type that the user requests to exchange for on-chain data structures of the second type. In the example of FIG. 2, the user wallet address is identified as "user_wallet_address:

"0x123krnkjensd . . . ." The user wallet address may include a unique identifier that represents an account on the first blockchain (e.g., accessible via device 150A). Through the account, a user may receive, store, and send instruments, such as tokens native to the first blockchain.

According to some examples, the blockchain operation request may also identify the types of on-chain data structure the user wishes to exchange between. This may be especially important where multiple types of tokens are supported on a blockchain or multiple types of cross-blockchain communications are available, and thus specifying the types of on-chain data structure the user wishes to exchange between is important so as to not enable inaccurate transfers. For example, the request may use the identifiers of the on-chain data structures to identify the type. Alternatively or additionally, the user wallet address may only support specific on-chain data structures, and identifying the on-chain data structures stored thereon may be used to identify the type of on-chain data structure. In other embodiments, the blockchain operation request may simply identify the identifiers for the first blockchain and second blockchain, "first_blockchain_id: 'AAA'" and "second_blockchain_id: 'BBB,'" and the system may interpret the type of exchange to be between an on-chain data structure type native to the first blockchain and an on-chain data structure type originating from the second blockchain. For example, if the first blockchain identifier included "Ethereum" and the second blockchain identifier included "Bitcoin," the system could interpret the exchange to be from ETH, native to Ethereum, to BTC, native to Bitcoin.

Alternatively or additionally, the blockchain operation request may simply identify the first and second asset type, e.g., "first_asset_type: 'ATYPE'" and "second_asset_type: 'BTYPE'." This may be especially useful where a blockchain supports multiple types of on-chain data structures. For example, Ethereum may also support stablecoins such as USDT and USDC as well as ETH. In this case, it may be useful for the request to identify which of a group of supported on-chain data structure types is meant to be exchanged to or from. Furthermore, the blockchain operation request 200 may further include "request_id: 'd2nj2k3jn,'" which may be used to identify the request downstream. The request identifier may also include a unique alphanumeric string.

Communication subsystem 162 may pass the requested data, or a pointer to the data in memory, to the blockchain storage determination subsystem 164, which may be used by the system to determine whether or not cross-chain communication is necessary. In particular, the blockchain storage determination subsystem 164 may determine whether on-chain data structures of the first type are stored on a first blockchain and the on-chain data structures of the second type are stored on a second blockchain different from the first blockchain.

In some examples, the blockchain storage determination subsystem 164 may simply compare the first blockchain identifier and second blockchain identifier to determine that cross-chain communication is necessary because the on-chain data structures of the first and second type are stored on or originated from different blockchains. Similarly, the first asset type and second asset type may be compared. According to some embodiments, blockchain storage determination subsystem 164 may determine that on-chain data structures of the first type are stored on the first blockchain and on-chain data structures of the second type are stored on the second blockchain using the address of each. For example, blockchain storage determination subsystem 164 may determine a first data structure address associated with the first type and a second data structure address associated with the second type. The blockchain storage determination subsystem 164 may then determine that the first data structure address exists on the first blockchain and that the second data structure address does not exist on the first blockchain and exists on the second blockchain.

Blockchain storage determination subsystem 164 may pass the determination, or a pointer to the data in memory, to the control transfer subsystem 166. As described herein, since the first user may not be able to directly obtain on-chain data structures of the second type, e.g., on the second blockchain, the first user may need to use an intermediary, such as a transfer agent, who is enabled to exchange between on-chain data structures of different types. Responsive to determining that cross-chain communication is needed, e.g., because the on-chain data structures of the first and second type are on different blockchains, the control transfer subsystem 166 may cause the on-chain data structures of the first type to be transferred from the first user to the transfer agent. As described herein, the transfer agent may refer to a financial institution or service provider responsible for maintaining records of an entity's stockholders and managing securities transactions. According to some embodiments, the blockchain is a private blockchain for an entity such as a company. The transfer agent may then be enabled to exchange, e.g., with a fund manager or transfer agent, on the second blockchain.

According to some embodiments, many users on the first blockchain may share use of the transfer agent. The transfer agent may be allowed to make certain transfers that a regular user on the blockchains may not be able to make due to regulatory, operational, and/or security reasons. For example, funds and securities often have regulatory constraints and transfer agents can ensure that transactions comply with these rules. Furthermore, transfer agents may manage cap tables and official records of ownership, ensuring compliance with fund rules. Transfer agents may act in accordance with one or more on-chain programs that are limited or vetted in some way by different entities, further preventing erroneous of fraudulent behavior that may occur if users were enabled to make cross-chain exchanges with custom smart contracts, for example. In particular, to transfer the on-chain data structure of the first type, the control transfer subsystem 166 may execute a blockchain operation that transfers control of on-chain data structures of the first type to be controlled by a second cryptography-based storage application associated with an agent (e.g., the transfer agent) on the first blockchain. The second cryptography-based storage application may be owned and/or otherwise managed by the transfer agent, e.g., via an entity device such as device 150B.

Figure 3:
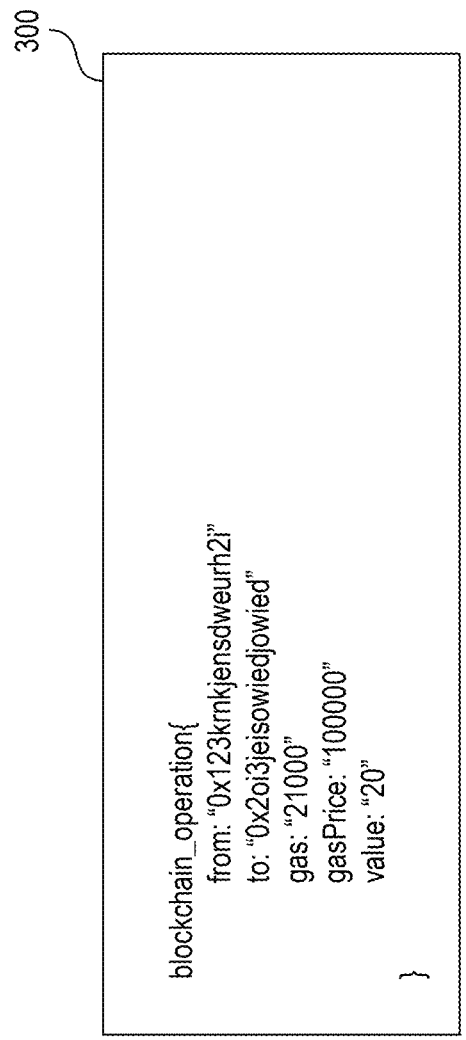
FIG. 3 illustrates an exemplary blockchain operation that transfers control of on-chain data structures, in accordance with one or more embodiments of this disclosure.

For example, FIG. 3 illustrates an exemplary blockchain operation 300 that transfers control of on-chain data structures, in accordance with one or more embodiments of this disclosure. The blockchain operation 300 may identify an address from which the on-chain data structures of the first type are to be moved. In the example of FIG. 3, this is identified in the field "from: '0x123krnkjensdweurh2i'." The "from" address may be the same as the "user_wallet_address" in blockchain operation request 200. Blockchain operation 300 may identify to where the on-chain data structure should be transmitted. In particular, the on-chain data structures of the first type should be transferred to the transfer agent on the first blockchain. Blockchain operation 300 identifies a transfer agent by their address "to: '0x2oi3jeisowiedjowied'." The operation may also include other data such as "gasPrice" indicating the price per unit of gas, e.g., in wei, and "gas" indicating the gas limit. Blockchain operation 300 may also identify the number of on-chain data structures of the first type being transferred from the first user to a transfer agent.

The blockchain operation may be submitted to the first blockchain network, such as by the second cryptography-based storage application via data node 110A. The transaction may be broadcast to the network and distributed to other nodes to verify its validity. Once validated, the transaction may be grouped with other transactions into a new block. In some embodiments, the block may include a reference to the previous block, ensuring continuity. Once the block is accepted into the first blockchain, it may be appended to the blockchain. As described herein, the system may be a smart contract deployed on the first blockchain. Once the transaction is finalized, the smart contract may emit events to notify the system. In some embodiments, cross-chain messaging system 160 may determine that the blockchain operation was successful based on the emitted event. Alternatively or additionally, the cross-chain messaging system 160 may determine the operation was successful by searching up the transaction based on the wallet address (e.g., of the first user or transfer agent), block number, or transaction hash. If the transaction status indicates "success" the system may determine the operation was successful. If the transaction status indicates "pending" or "failed" the system may determine the operation was not successful.

As described herein, in some embodiments, the user's tokens, or other on-chain data structures, may not be supported by the agent. Thus, the messaging system may first exchange the user's tokens into another token type that is supported by the agent. For example, an agent may support USD tokens while the user may have SGD tokens. Accordingly, the messaging system may first exchange the SGD tokens into the USD tokens before proceeding with sending a message to the second blockchain. In such a case, because the transfer agent may not support the first type of on-chain data structure, the system must first transfer the first type of on-chain structure to an intermediate on-chain data structure that the transfer agent can use. In particular, based on determining that the first type is not supported by the agent, the control transfer subsystem may execute a blockchain operation that obtains control of different on-chain data structures of a third type.

That is, rather than the example where the transfer agent exchanges on-chain data structures of a first type for a second type, an operation may be executed based on relinquishing control of the on-chain data structures of the first type, e.g., in exchange for those of a third type, wherein the third type is supported by the agent. This third type of on-chain data structure may act as an intermediate between the first and second type so that the transfer agent can be used to facilitate the exchange. In some examples, the transfer agent may automatically identify an intermediary type of on-chain data structure with which the first type can be exchanged such that the transfer agent is enabled to transfer on-chain data structures of the second type to the user.

In response to a confirmation that the blockchain operation was successful, the communication subsystem 162 may cause a first cross-blockchain message to be transmitted to a second on-chain program (e.g., smart contract) on the second blockchain instructing the second on-chain program to transfer the second plurality of on-chain data structures of the second type to be controlled by the user. For example, FIG. 4A illustrates an exemplary cross-chain message 400 for instructing transfer of on-chain data structures, in accordance with one or more embodiments of this disclosure. As described herein, a cross-chain (also referred to herein as "cross-blockchain") message may include a communication or data transfer between two different blockchain networks such as the first blockchain accessible via data node 110A and the second blockchain accessible via data node 110B.

In order to send cross-chain messages, an interoperability service, also called an "interop" service, may be used. As referred to herein, an "interop" service may include a system or protocol that enables different blockchain networks or applications to communicate, share data, and transfer assets. It may act, for example, as a middleware layer that facilitates cross-chain interactions without requiring each blockchain to be directly aware of the other's infrastructure, thus enabling security. The interop service may include a cross-chain bridge, specific blockchain communication protocols, or oracles for cross-chain data.

As described herein, cross-chain message 400 may be used to instruct the second blockchain to transfer the on-chain data structures of the second type to the user. That is, the cross-chain message 400 enables completion of the transfer by providing the user with the exchanged on-chain data structures of the second type. The cross-chain message 400 may indicate a source blockchain, from which the message is sent, and a destination blockchain, to which the message is sent. In particular, the message indicates that the first blockchain is "AAA" while the second is "BBB." The cross-chain message 400 also indicates the sender's address "sender: '0x2oi3jeisowiedjowied'." As can be seen in the example of FIG. 3, the sender of the cross-chain message may be the transfer agent (e.g., intermediary) to which the first user has sent on-chain data structures of the first type. The transfer agent is permitted, unlike the first user, to exchange the on-chain data structures. The cross-chain message indicates who the sender is sending the data to; namely, via an address, e.g., "receiver: '0x2kmk2emdwlswe3'." The receiver may be a receiving address at the second blockchain (e.g., "BBB").

In the example of cross-chain message 400, the payload "0xqoijeo23ijdwsdjdewwedsdg23jhew" may include data for executing an action on the destination chain. For example, the payload may call a smart contract or include token information if transferring tokens. The payload could also include, for example, an exchange rate between on-chain data structures of a first type and a second type. Cross-chain message 400 includes a function call "exchange" and indicates an amount "24" that could cause the destination blockchain to transfer 24 on-chain data structures of the first type to the equivalent amount (e.g., using the exchange rate) of on-chain data structures of the second type. The amount of "24" may be the requested number of on-chain data structures of the second type.

In particular, causing the first cross-chain message to be transmitted to the second blockchain may include identifying a blockchain address of the second on-chain program on the second blockchain, e.g., by extracting the destination blockchain and/or the receiver address. The first cross-blockchain message may be transmitted to a blockchain node on the second blockchain with the blockchain address, e.g., at address "0x2kmk2emdwlswe3," of the second on-chain program. For example, the first cross-chain message 400 may be transmitted, e.g., via data node 110B on the second blockchain.

The second blockchain may then, responsive to receiving the first cross-chain message, transfer the on-chain data structures of the second type to the user. The second blockchain, e.g., via data node 110B, may transmit a second cross-chain message indicating that the on-chain data structures of the second type are now controlled by the user. Based on receiving the second cross-chain message, the cross-chain messaging system 160 may transmit a notification to the user indicating that the blockchain operation request succeeded so that the user is aware that they may now have on-chain data structures of the second type available, e.g., for use to transfer, purchase other products, etc. For example, FIG. 4B illustrates an exemplary cross-chain message 410 indicating that on-chain data structures are controlled by a user, e.g., after transfer, in accordance with one or more embodiments of this disclosure.

Cross-chain message 410 may be received at the first blockchain from the second blockchain. As such, cross-chain message 410 has the opposite source blockchain and destination blockchain as in the cross-chain message 400. In particular, the cross-chain message 410 identifies "BBB" as the source blockchain and "AAA" as the destination blockchain. The sender of the message may be the transfer agent, fund manager, or other intermediary at the second blockchain. The recipient may be the user at the user address "0x123krnkjensdweurh2i." Alternatively or additionally, the recipient may be the transfer agent "0x2oi3jeisowiedjowied," which may verify the exchange prior to transferring control of the on-chain data structures of the second type back to the first user, e.g., such as using a blockchain operation similar to blockchain operation 300 with different values.

According to some examples, the cross-chain messaging system may retrieve, from the second cross-chain message, an operation hash generated by the second blockchain when the on-chain data structures of the second type were assigned to be controlled by the user. For example, the second cross-chain message may include a transaction identifying hash "txid:ej3n5kdwjnd." The cross-chain messaging system 160 may generate and transmit a command to the second blockchain for determining a status of the second plurality of on-chain data structures of the second type using the hash. The second blockchain may identify the transaction using the hash as well as the status of the transaction as successful or not successful. The second blockchain may respond to the command by transmitting transaction parameters, such as the status of the transaction. The cross-chain messaging system may then determine, based on parameters received in response to the command, the status of the blockchain operation request.

According to some embodiments, when the intermediary at the second blockchain transfers control of on-chain data structures of the second type to the user, the first and second blockchains may implement a burn-and-mint exchange model whereby the on-chain data structures of the second type existing on the source chain are burned (e.g., permanently removed from circulation) and an equivalent amount may be minted on the destination chain. This may ensure, for example, that the total supply of the on-chain data structures of the second type remain constant across different blockchains. Alternatively or additionally, the second blockchain may implement a lock-and-mint model whereby tokens on the source chain are locked in a smart contract and a wrapped version is minted on the destination chain. In this example, when tokens are moved back, the wrapped tokens may be burned and the locked tokens may be unlocked and released back onto the blockchain for use. Alternatively or additionally, the system may use a liquidity pool model, whereby a liquidity pool, such as one handled by a fund manager or transfer agent on the first and second blockchains, may handle conversions.

As described herein, cross-chain messaging system 160 may also enable a user to exchange the on-chain data structures back (e.g., for a profit). Thus, the messaging system may receive a request to exchange the on-chain data structures of the second type back to the original type (e.g., the first type) the user had. For example, a user may initiate such a transfer by sending the request via a cryptography-based storage application, e.g., via device 150A. The cross-chain messaging system 160 may receive, from the user via the first cryptography-based storage application, a new blockchain operation request to relinquish control of the second plurality of on-chain data structures of the second type (e.g., via communication subsystem 162). Cross-chain messaging system 160 may transmit a new cross-chain message instructing the second on-chain program on the second blockchain to transfer control of the on-chain data structures of the second type to the agent (e.g., transfer agent). The system may then determine the correct amount of on-chain data structures of the first type to transfer to the user. Alternatively or additionally, if, as described herein, a third type of on-chain data structure was used as an intermediary, the second on-chain program may determine a number of on-chain data structures of the third type corresponding to the second plurality of on-chain data structures of the second type.

Thus, the messaging system may instruct the user's wallet to relinquish control of the target tokens. Once that has been completed, the messaging system may send a message from the second blockchain to the first blockchain indicating that the transfer completed successfully. The messaging system may then determine the exchange rate (e.g., the profit) between the tokens and transfer the original types of tokens back to the user's wallet (e.g., including the profit). In particular, in response to receiving a second new cross-chain message indicating a successful transfer of the number of on-chain data structures of the second type to be controlled by the agent on the second blockchain, cross-chain messaging system 160 may assign the number of on-chain data structures of the first type to be controlled by the first cryptography-based storage application associated with the user, or where an intermediary type of on-chain data structure was used, cross-chain messaging system 160 may assign the number of on-chain data structures of the third (e.g., intermediary) type to be controlled by the first cryptography-based storage application associated with the user.

Figure 5:
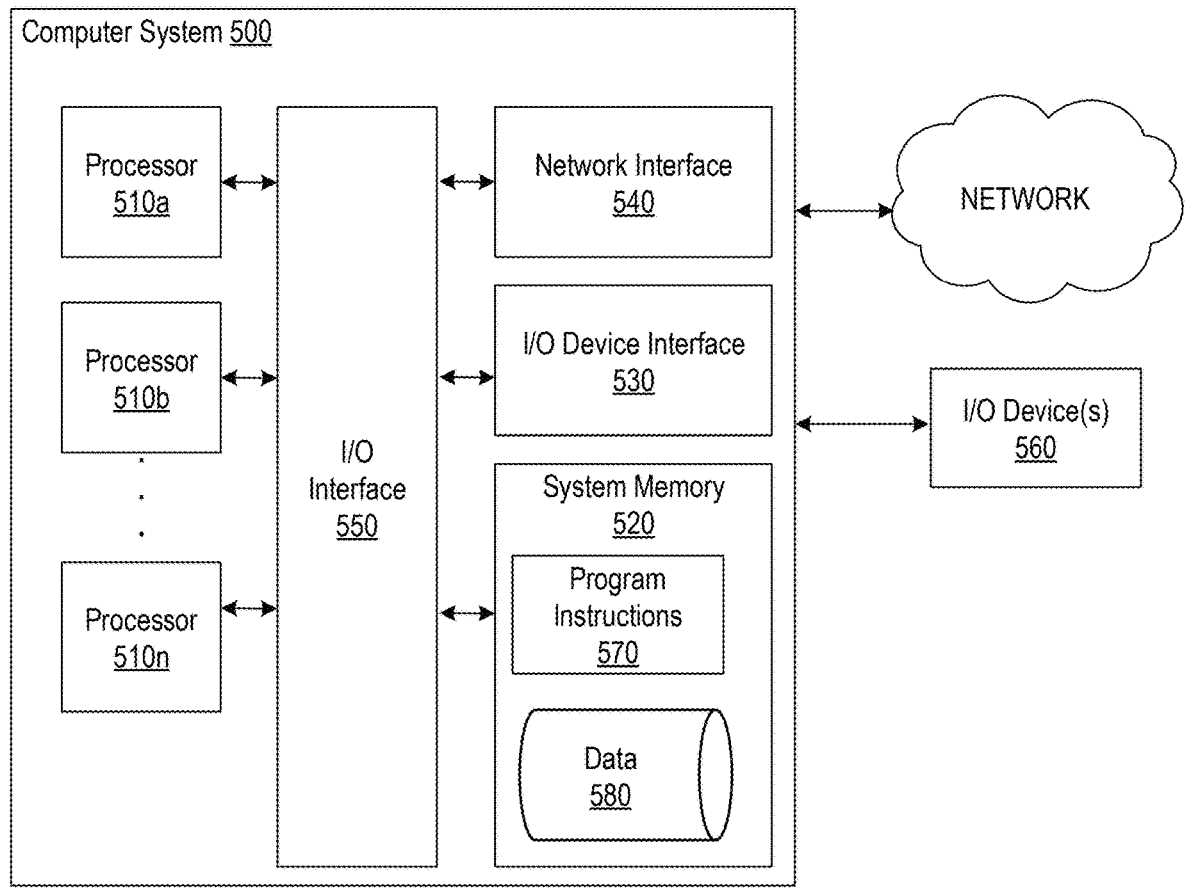
FIG. 5 illustrates a computing system that can be used for using on-chain programs for message transfer, in accordance with one or more embodiments of this disclosure.

FIG. 5 shows an example computing system that may be used in accordance with some embodiments of this disclosure. In some instances, computing system 500 is referred to as a "computer system 500." A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 520). Computing system 500 may be a uni-processor system including one processor (e.g., processor 510a) or a multiprocessor system including any number of suitable processors (e.g., processors 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

The I/O device interface 530 and I/O devices 560 may be used to enable manipulation of the three-dimensional model as well. For example, the user may be able to use I/O devices such as a keyboard and a touchpad to indicate specific selections for nodes, adjust values for nodes, select from the history of machine learning models, select specific inputs or outputs, and/or the like. Alternatively or additionally, the user may use their voice to indicate specific nodes, specific models, and/or the like via the voice recognition device and/or microphones.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a LAN, a WAN, a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated or may operate as a stand-alone system. In addition, the functionality provided by the illustrated components may, in some embodiments, be combined in fewer components or be distributed in additional components. Similarly, in some embodiments, the functionality of some of the illustrated components may not be provided, or other additional functionality may be available.

Figure 6:
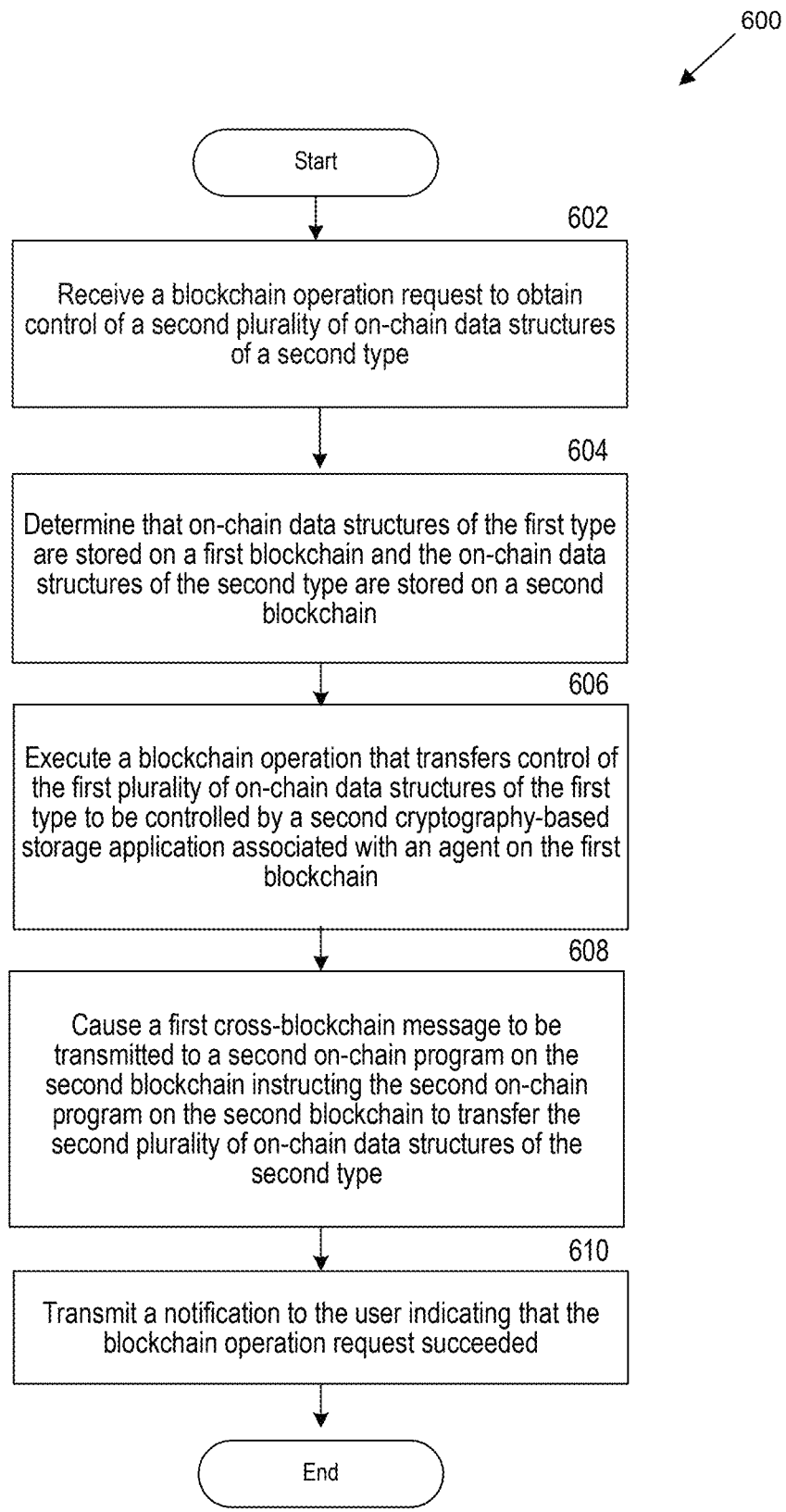
FIG. 6 is a flowchart of operations for using on-chain programs for message transfer, in accordance with one or more embodiments of this disclosure.

FIG. 6 is a flowchart 600 of operations for using on-chain programs for message transfer, in accordance with one or more embodiments of this disclosure. The operations of FIG. 6 may use components described in relation to FIG. 5. In some embodiments, cross-chain messaging system 160 may include one or more components of computer system 500.

At operation 602, one or more of processors 510a-510n may be used to receive a blockchain operation request to obtain control of a second plurality of on-chain data structures of a second type. According to some embodiments, the request may be received using a first on-chain program from a user via a first cryptography-based storage application. In some embodiments, the blockchain operation request includes identifiers for a first plurality of on-chain data structures of a first type. One or more of processors 510a-510n may receive such requests over communication network 140 using network interface 540.

At operation 604, one or more of processors 510a-510n may further determine that on-chain data structures of the first type are stored on a first blockchain and the on-chain data structures of the second type are stored on a second blockchain. At operation 606, one or more of processors 510a-510n may execute a blockchain operation that transfers control of the first plurality of on-chain data structures of the first type to be controlled by a second cryptography-based storage application associated with an agent on the first blockchain.

At operation 608, one or more of processors 510a-510n may cause a first cross-blockchain message to be transmitted to a second on-chain program on the second blockchain instructing the second on-chain program on the second blockchain to transfer the second plurality of on-chain data structures of the second type. For example, the processor(s) may cause the cross-blockchain message to be transmitted in response to a confirmation that the blockchain operation was successful.

At operation 610, one or more of processors 510a-510n may transmit a notification to the user indicating that the blockchain operation request succeeded. In some examples, the processor(s) may transmit the notification based on receiving a second cross-chain message indicating that the second plurality of on-chain data structures of the second type are now controlled by the user.

Figure 7:
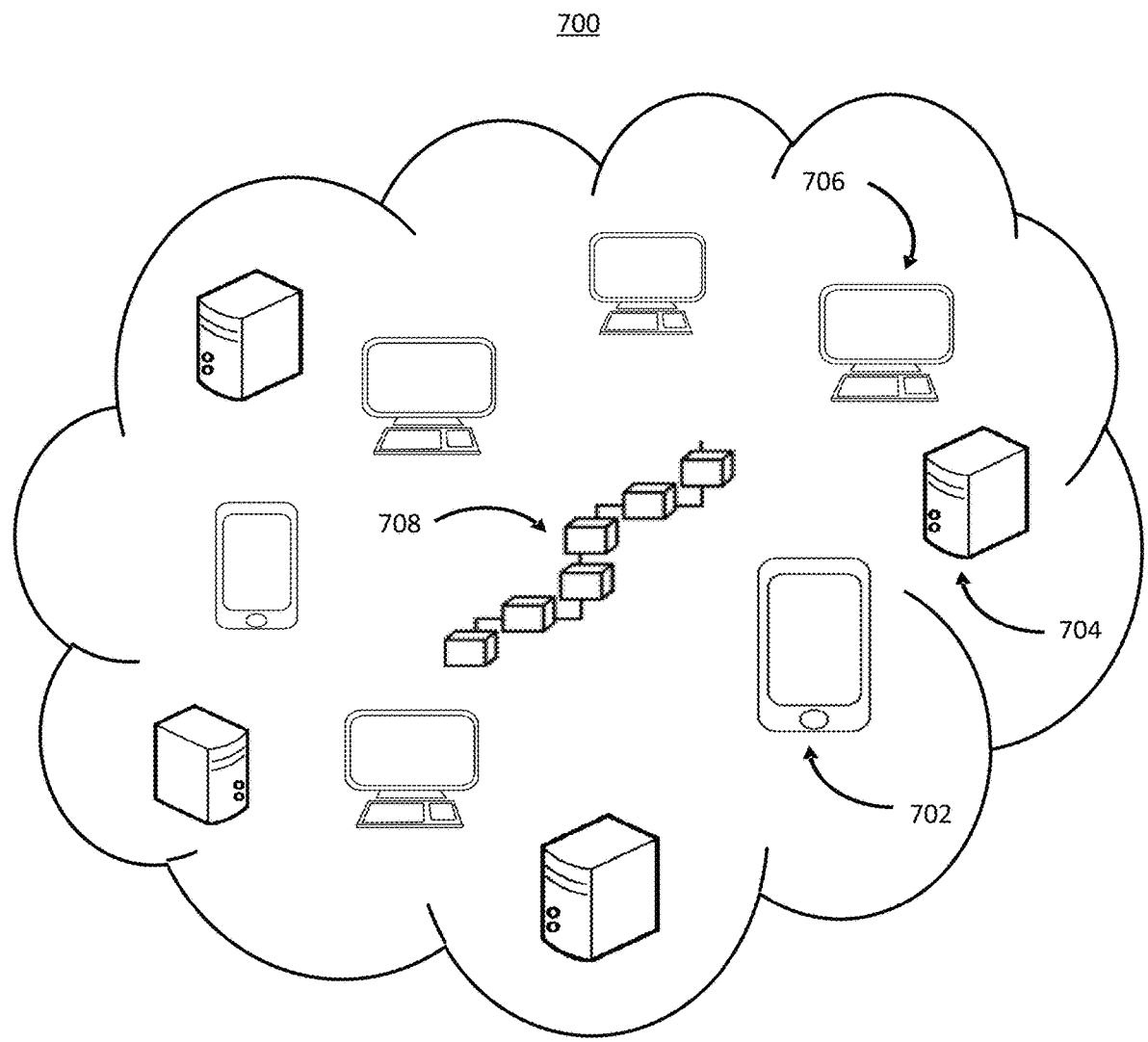
FIG. 7 shows an illustrative diagram for a decentralized environment for performing blockchain functions (sometimes referred to as "blockchain operations"), in accordance with one or more embodiments.

FIG. 7 shows an illustrative diagram for a decentralized environment for performing blockchain functions (sometimes referred to as "blockchain operations"), in accordance with one or more embodiments. For example, the diagram presents various components that may be used for transferring control of vehicle information to other users using NFTs in some embodiments.

As shown in FIG. 7, system 700 may include multiple user devices (e.g., user device 702, user device 704, and/or user device 706). For example, system 700 may comprise a distributed state machine, in which each of the components in FIG. 7 acts as a client of system 700. For example, system 700 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 700 may interact with, and facilitate the function of, blockchain 708.

It should be noted that, while shown as a smartphone, a personal computer, and a server in FIG. 7, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing the system 700 performing a blockchain function may equally be applied to, and correspond to, an individual user device (e.g., user device 702, user device 704, and/or user device 706) performing the blockchain function. That is, system 700 may correspond to the user devices (e.g., user device 702, user device 704, and/or user device 706) collectively or individually.

Each of the user devices may be used by the system to conduct blockchain functions. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including an NFT. An NFT may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 7, one or more user devices may include a digital wallet (e.g., digital wallet associated with user device 704) used to perform blockchain functions. A digital wallet may be referred to as a "cryptography-based storage application." For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 7, one or more user devices may include a private key and/or digital signature. A digital signature may sometimes be referred to as a "cryptographic signature." For example, system 700 may use cryptographic systems for conducting blockchain functions, such as for transferring control of vehicle information to other users using NFTs. For example, system 700 may use public key cryptography, which features a pair of digital keys (e.g., which may comprise strings of data). In such cases, each pair comprises a public key (e.g., which may be public) and a private key (e.g., which may be kept private). System 700 may generate the key pairs using cryptographic algorithms (e.g., featuring one-way functions). System 700 may then encrypt a message (or other blockchain function) using an intended receiver's public key such that the encrypted message may be decrypted only with the receiver's corresponding private key. In some embodiments, system 700 may combine a message with a private key to create a digital signature on the message. For example, the digital signature may be used to verify the authenticity of blockchain functions. As an illustration, when conducting blockchain functions, system 700 may use the digital signature to prove to every node in the system that it is authorized to conduct the blockchain functions.

For example, system 700 may comprise a plurality of nodes for the blockchain network. Each node may correspond to a user device (e.g., user device 702). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 702 may request a blockchain function (e.g., conduct a transaction). The blockchain function may be authenticated by user device 704 and/or another node (e.g., a user device in the community network of system 700). For example, using cryptographic keys, system 700 may identify users and give access to their respective user accounts (e.g., corresponding digital wallets) within system 700. Using private keys (e.g., known only to the respective users) and public keys (e.g., known to the community network), system 700 may create digital signatures to authenticate the users.

Following an authentication of the blockchain function, the blockchain function may be authorized. For example, after the blockchain function is authenticated between the users, system 700 may authorize the blockchain function prior to adding it to the blockchain. System 700 may add the blockchain function to blockchain 708. System 700 may perform this based on a consensus of the user devices within system 700. For example, system 700 may rely on a majority (or other metric) of the nodes in the community network (e.g., user device 702, user device 704, and/or user device 706) to determine that the blockchain function is valid. In response to validation of the block, a node user device (e.g., user device 702, user device 704, and/or user device 706) in the community network (e.g., a miner) may receive a reward (e.g., in a given cryptocurrency) as an incentive for validating the block.

To validate the blockchain function, system 700 may use one or more validation protocols and/or validation (or consensus) mechanisms. For example, system 700 may use a Proof of Work (POW) mechanism in which a user device must provide evidence that it performed computational work to validate a blockchain function, and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 700 may use a Proof of Stake (POS) mechanism in which a user account (e.g., corresponding to a node on the blockchain network) is required to have, or "stake," a predetermined amount of tokens in order for system 700 to recognize it as a validator in the blockchain network.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: receiving, using a first on-chain program from a user via a first cryptography-based storage application, a blockchain operation request to obtain control of a second plurality of on-chain data structures of a second type, wherein the blockchain operation request comprises identifiers of a first plurality of on-chain data structures of a first type; determining that on-chain data structures of the first type are stored on a first blockchain and the on-chain data structures of the second type are stored on a second blockchain; executing a first blockchain operation that obtains control of a third plurality of on-chain data structures of a third type based on relinquishing control of the first plurality of on-chain data structures of the first type; executing a second blockchain operation that transfers control of the third plurality of on-chain data structures of the third type to be controlled by a second cryptography-based storage application associated with an agent on the first blockchain; in response to a confirmation that the second blockchain operation was successful, generating a first cross-blockchain message to a second on-chain program on the second blockchain instructing the second on-chain program on the second blockchain to transfer the second plurality of on-chain data structures of the second type to be controlled by the user; causing the first cross-blockchain message to be transmitted to the second blockchain; and based on receiving a second cross-chain message indicating that the second plurality of on-chain data structures of the second type are now controlled by the user, transmitting a notification to the user indicating that the blockchain operation request succeeded.

A2. A method comprising: receiving, using a first on-chain program from a user via a first cryptography-based storage application, a blockchain operation request to obtain control of a second plurality of on-chain data structures of a second type, wherein the blockchain operation request comprises identifiers of a first plurality of on-chain data structures of a first type; determining that on-chain data structures of the first type are stored on a first blockchain and the on-chain data structures of the second type are stored on a second blockchain; executing a blockchain operation that transfers control of the first plurality of on-chain data structures of the first type to be controlled by a second cryptography-based storage application associated with an agent on the first blockchain; in response to a confirmation that the blockchain operation was successful, causing a first cross-blockchain message to be transmitted to a second on-chain program on the second blockchain instructing the second on-chain program on the second blockchain to transfer the second plurality of on-chain data structures of the second type to be controlled by the user; and based on receiving a second cross-chain message indicating that the second plurality of on-chain data structures of the second type are now controlled by the user, transmitting a notification to the user indicating that the blockchain operation request succeeded.

A3. The method of any of the preceding embodiments, further comprising: determining that the first type is not supported by the agent; and executing a second blockchain operation that obtains control of a third plurality of on-chain data structures of a third type based on relinquishing control of the first plurality of on-chain data structures of the first type, wherein the third type is supported by the agent.

A4. The method of any of the preceding embodiments, further comprising: receiving, from the user via the first cryptography-based storage application, a new blockchain operation request to relinquish control of the second plurality of on-chain data structures of the second type; transmitting a new cross-chain message instructing the second on-chain program on the second blockchain to transfer control of the second plurality of on-chain data structures of the second type to the agent, wherein the second on-chain program determines a number of on-chain data structures of the third type corresponding to the second plurality of on-chain data structures of the second type; and in response to receiving a second new cross-chain message indicating a successful transfer of the number of on-chain data structures of the second type to be controlled by the agent on the second blockchain, assigning the number of on-chain data structures of the third type to be controlled by the first cryptography-based storage application associated with the user.

A5. The method of any of the preceding embodiments, wherein determining that the first plurality of on-chain data structures of the first type are stored on the first blockchain and the on-chain data structures of the second type are stored on the second blockchain further comprises: determining a first data structure address associated with the first type and a second data structure address associated with the second type; and determining that the first data structure address exists on the first blockchain and determining that the second data structure address does not exist on the first blockchain and exists on the second blockchain.

A6. The method of any of the preceding embodiments, further comprising determining that the blockchain operation was successful.

A7. The method of any of the preceding embodiments, wherein causing the first cross-blockchain message to be transmitted to the second blockchain further comprises: identifying a blockchain address of the second on-chain program on the second blockchain; and transmitting the first cross-blockchain message to a blockchain node on the second blockchain with the blockchain address of the second on-chain program.

A8. The method of any of the preceding embodiments, further comprising: retrieving, from the second cross-chain message, an operation hash generated by the second blockchain when the second plurality of on-chain data structures of the second type were assigned to be controlled by the user; transmitting a command to the second blockchain for determining a status of the second plurality of on-chain data structures of the second type; and determining, based on parameters received in response to the command, the status of the blockchain operation request.

A9. One or more tangible, non-transitory, computer-readable media storing instructions that, when executed by a data processing apparatus, cause the data processing apparatus to perform operations comprising those of any of embodiments A1-A8.

A10. A system comprising: one or more processors; and memory storing instructions that, when executed by the one or more processors, cause the processors to effectuate operations comprising those of any of embodiments A1-A8.

A11. A system comprising means for performing any of embodiments A1-A8.

A12. A system comprising cloud-based circuitry for performing any of embodiments A1-A8.

What is claimed is:

1. A system for using on-chain programs for message transfer, the system comprising:
   one or more processors; and
   one or more non-transitory, computer-readable storage media storing instructions, which when executed by the one or more processors cause the one or more processors to perform operations comprising:
      receiving, using a first on-chain program from a user via a first cryptography-based storage application, a blockchain operation request to obtain control of a second plurality of on-chain data structures of a second type, wherein the blockchain operation request comprises identifiers of a first plurality of on-chain data structures of a first type;
      determining that the first plurality of on-chain data structures of the first type are stored on a first blockchain and the second plurality of on-chain data structures of the second type are stored on a second blockchain;
      executing a first blockchain operation that obtains control of a third plurality of on-chain data structures of a third type based on relinquishing control of the first plurality of on-chain data structures of the first type;
      executing a second blockchain operation that transfers control of the third plurality of on-chain data structures of the third type to be controlled by a second cryptography-based storage application associated with an agent on the first blockchain;
      in response to a confirmation that the second blockchain operation was successful, generating a first cross-chain message to a second on-chain program on the second blockchain instructing the second on-chain program on the second blockchain to transfer the second plurality of on-chain data structures of the second type to be controlled by the user, wherein the first cross-chain message comprises a call to execute the second on-chain program with an identifier of the second on-chain program on the second blockchain;
      causing the first cross-chain message to be transmitted to the second blockchain; and
      based on receiving a second cross-chain message indicating that the second plurality of on-chain data structures of the second type are now controlled by the user, transmitting a notification to the user indicating that the blockchain operation request succeeded.

2. The system of claim 1, wherein the instructions further cause the one or more processors to perform operations comprising:
   receiving, from the user via the first cryptography-based storage application, a new blockchain operation request to relinquish control of the second plurality of on-chain data structures of the second type;
   transmitting a new cross-chain message instructing the second on-chain program on the second blockchain to transfer control of the second plurality of on-chain data structures of the second type to the agent, wherein the second on-chain program determines a number of on-chain data structures of the third type corresponding to the second plurality of on-chain data structures of the second type; and
   in response to receiving a second new cross-chain message indicating a successful transfer of the number of on-chain data structures of the second type to be controlled by the agent on the second blockchain, assigning the number of on-chain data structures of the third type to be controlled by the first cryptography-based storage application associated with the user.

3. The system of claim 1, wherein the instructions for determining that the first plurality of on-chain data structures of the first type is stored on the first blockchain and the second plurality of on-chain data structures of the second type is stored on the second blockchain further cause the one or more processors to perform operations comprising:
   determining a first data structure address associated with the first type and a second data structure address associated with the second type; and
   determining that the first data structure address exists on the first blockchain and determining that the second data structure address does not exist on the first blockchain and exists on the second blockchain.

4. The system of claim 1, wherein the instructions further cause the one or more processors to determine that the second blockchain operation was successful.

5. The system of claim 1, wherein the instructions for causing the first cross-chain message to be transmitted to the second blockchain further cause the one or more processors to perform operations comprising:
   identifying a blockchain address of the second on-chain program on the second blockchain; and
   transmitting the first cross-chain message to a blockchain node on the second blockchain with the blockchain address of the second on-chain program.

6. The system of claim 1, wherein the instructions further cause the one or more processors to perform operations comprising:
   retrieving, from the second cross-chain message, an operation hash generated by the second blockchain when the second plurality of on-chain data structures of the second type were assigned to be controlled by the user;
   transmitting a command to the second blockchain for determining a status of the second plurality of on-chain data structures of the second type; and
   determining, based on parameters received in response to the command, the status of the blockchain operation request.

7. A method for using on-chain programs for message transfer, the method comprising:
   receiving, using a first on-chain program from a user via a first cryptography-based storage application, a blockchain operation request to obtain control of a second plurality of on-chain data structures of a second type, wherein the blockchain operation request comprises identifiers of a first plurality of on-chain data structures of a first type;
   determining that the first plurality of on-chain data structures of the first type are stored on a first blockchain and the second plurality of on-chain data structures of the second type are stored on a second blockchain;

executing a blockchain operation that transfers control of the first plurality of on-chain data structures of the first type to be controlled by a second cryptography-based storage application associated with an agent on the first blockchain;

in response to a confirmation that the blockchain operation was successful, causing a first cross-chain message to be transmitted to a second on-chain program on the second blockchain instructing the second on-chain program on the second blockchain to transfer the second plurality of on-chain data structures of the second type to be controlled by the user, wherein the first cross-chain message comprises a call to execute the second on-chain program with an identifier of the second on-chain program on the second blockchain; and based on receiving a second cross-chain message indicating that the second plurality of on-chain data structures of the second type are now controlled by the user, transmitting a notification to the user indicating that the blockchain operation request succeeded.

8. The method of claim 7, further comprising:

determining that the first type is not supported by the agent; and executing a second blockchain operation that obtains control of a third plurality of on-chain data structures of a third type based on relinquishing control of the first plurality of on-chain data structures of the first type, wherein the third type is supported by the agent.

9. The method of claim 8, further comprising:

receiving, from the user via the first cryptography-based storage application, a new blockchain operation request to relinquish control of the second plurality of on-chain data structures of the second type;

transmitting a new cross-chain message instructing the second on-chain program on the second blockchain to transfer control of the second plurality of on-chain data structures of the second type to the agent, wherein the second on-chain program determines a number of on-chain data structures of the third type corresponding to the second plurality of on-chain data structures of the second type; and in response to receiving a second new cross-chain message indicating a successful transfer of the number of on-chain data structures of the second type to be controlled by the agent on the second blockchain, assigning the number of on-chain data structures of the third type to be controlled by the first cryptography-based storage application associated with the user.

10. The method of claim 7, wherein determining that the first plurality of on-chain data structures of the first type is stored on the first blockchain and the second plurality of on-chain data structures of the second type is stored on the second blockchain further comprises:

determining a first data structure address associated with the first type and a second data structure address associated with the second type; and determining that the first data structure address exists on the first blockchain and determining that the second data structure address does not exist on the first blockchain and exists on the second blockchain.

11. The method of claim 7, further comprising determining that the blockchain operation was successful.

12. The method of claim 7, wherein causing the first cross-chain message to be transmitted to the second blockchain further comprises:

identifying a blockchain address of the second on-chain program on the second blockchain; and transmitting the first cross-chain message to a blockchain node on the second blockchain with the blockchain address of the second on-chain program.

13. The method of claim 7, further comprising:

retrieving, from the second cross-chain message, an operation hash generated by the second blockchain when the second plurality of on-chain data structures of the second type were assigned to be controlled by the user;

transmitting a command to the second blockchain for determining a status of the second plurality of on-chain data structures of the second type; and determining, based on parameters received in response to the command, the status of the blockchain operation request.

14. One or more non-transitory, computer-readable storage media storing instructions that when executed by one or more processors cause the one or more processors to perform operations comprising:

receiving, using a first on-chain program from a user via a first cryptography-based storage application, a blockchain operation request to obtain control of a second plurality of on-chain data structures of a second type, wherein the blockchain operation request comprises identifiers of a first plurality of on-chain data structures of a first type;

determining that the first plurality of on-chain data structures of the first type are stored on a first blockchain and the second plurality of on-chain data structures of the second type are stored on a second blockchain;

executing a blockchain operation that transfers control of the first plurality of on-chain data structures of the first type to be controlled by a second cryptography-based storage application associated with an agent on the first blockchain;

in response to a confirmation that the blockchain operation was successful, causing a first cross-chain message to be transmitted to a second on-chain program on the second blockchain instructing the second on-chain program on the second blockchain to transfer the second plurality of on-chain data structures of the second type to be controlled by the user, wherein the first cross-chain message comprises a call to execute the second on-chain program with an identifier of the second on-chain program on the second blockchain; and based on receiving a second cross-chain message indicating that the second plurality of on-chain data structures of the second type are now controlled by the user, transmitting a notification to the user indicating that the blockchain operation request succeeded.

15. The one or more non-transitory, computer-readable storage media of claim 14, wherein the instructions further cause the one or more processors to perform operations comprising:

determining that the first type is not supported by the agent; and executing a second blockchain operation that obtains control of a third plurality of on-chain data structures of a third type based on relinquishing control of the first plurality of on-chain data structures of the first type, wherein the third type is supported by the agent.

16. The one or more non-transitory, computer-readable storage media of claim 15, wherein the instructions further cause the one or more processors to perform operations comprising:

receiving, from the user via the first cryptography-based storage application, a new blockchain operation request to relinquish control of the second plurality of on-chain data structures of the second type;

transmitting a new cross-chain message instructing the second on-chain program on the second blockchain to transfer control of the second plurality of on-chain data structures of the second type to the agent, wherein the second on-chain program determines a number of on-chain data structures of the third type corresponding to the second plurality of on-chain data structures of the second type; and in response to receiving a second new cross-chain message indicating a successful transfer of the number of on-chain data structures of the second type to be controlled by the agent on the second blockchain, assigning the number of on-chain data structures of the third type to be controlled by the first cryptography-based storage application associated with the user.

17. The one or more non-transitory, computer-readable storage media of claim 14, wherein the instructions for determining that the first plurality of on-chain data structures of the first type is stored on the first blockchain and the second plurality of on-chain data structures of the second type is stored on the second blockchain further cause the one or more processors to perform operations comprising:

determining a first data structure address associated with the first type and a second data structure address associated with the second type; and determining that the first data structure address exists on the first blockchain and determining that the second data structure address does not exist on the first blockchain and exists on the second blockchain.

18. The one or more non-transitory, computer-readable storage media of claim 14, wherein the instructions further cause the one or more processors to determine that the blockchain operation was successful.

19. The one or more non-transitory, computer-readable storage media of claim 14, wherein the instructions for causing the first cross-chain message to be transmitted to the second blockchain further cause the one or more processors to perform operations comprising:

identifying a blockchain address of the second on-chain program on the second blockchain; and transmitting the first cross-chain message to a blockchain node on the second blockchain with the blockchain address of the second on-chain program.

20. The one or more non-transitory, computer-readable storage media of claim 14, wherein the instructions further cause the one or more processors to perform operations comprising:

retrieving, from the second cross-chain message, an operation hash generated by the second blockchain when the second plurality of on-chain data structures of the second type were assigned to be controlled by the user;

transmitting a command to the second blockchain for determining a status of the second plurality of on-chain data structures of the second type; and determining, based on parameters received in response to the command, the status of the blockchain operation request.

\* \* \* \* \*